United States Patent
Furuya et al.

(10) Patent No.: US 6,881,188 B2
(45) Date of Patent: Apr. 19, 2005

(54) ELECTRONIC ENDOSCOPE SYSTEM WITH LIQUID SUPPLY APPARATUS

(75) Inventors: Katsuhiko Furuya, Saitama (JP); Haruhiko Hibi, Tokyo (JP); Mitsuru Iida, Saitama (JP)

(73) Assignee: PENTAX Corporation, Tokyo (JP)

(*) Notice: Subject to any disclaimer, the term of this patent is extended or adjusted under 35 U.S.C. 154(b) by 105 days.

(21) Appl. No.: 10/231,122

(22) Filed: Aug. 30, 2002

(65) Prior Publication Data

US 2003/0043264 A1 Mar. 6, 2003

(30) Foreign Application Priority Data

Sep. 3, 2001 (JP) .................................... P2001-265305

(51) Int. Cl.⁷ .............................................. A61B 1/12
(52) U.S. Cl. .................... 600/158; 600/153; 600/156
(58) Field of Search ............................... 600/153, 155, 600/156, 157, 158, 159

(56) References Cited

U.S. PATENT DOCUMENTS 5,891,014 A * 4/1999 Akiba .......................... 600/158
6,354,519 B1   3/2002 Kidooka et al.
6,387,045 B1 * 5/2002 Takahashi .................... 600/159

FOREIGN PATENT DOCUMENTS

JP         2001-170003         6/2001

OTHER PUBLICATIONS

English Language Translation for JP Appln. No. 2001-170003.

* cited by examiner

Primary Examiner—Beverly M. Flanagan
(74) Attorney, Agent, or Firm—Greenblum & Bernstein, P.L.C.

(57) ABSTRACT

An electronic endoscope system has a video-scope, a video-processor, and a liquid supply apparatus. The video-scope has a liquid transmitting tube for spouting liquid from a tip of the video-scope, and is detachably and electrically connected to the video-processor. The liquid supply apparatus is electrically connectable to the video-processor, and has a container for storing liquid and a liquid supplier that supplies the liquid in the container to the liquid transmitting tube. A liquid jet performance member for spouting the liquid is provided on the video-scope. A liquid jet performance detector detects operational status of the liquid jet performance member, and a liquid jet performance transmitter feeds a control signal regarding the operational status of the liquid jet performance member to the liquid supply apparatus. The liquid supplier supplies the liquid in the container to the liquid transmitting tube in accordance with the control signal.

9 Claims, 5 Drawing Sheets

ELECTRONIC ENDOSCOPE SYSTEM WITH LIQUID SUPPLY APPARATUS

BACKGROUND OF THE INVENTION

1. Field of the Invention

The present invention relates to an electronic endoscope system having a video-scope with an image sensor, and a video-processor. Especially, the present invention relates to an electronic endoscope system with a video-scope having a water transmitting tube for spouting water from the tip of the video-scope, and a water supply apparatus for supplying water to the water transmitting tube.

2. Description of the Related Art

In the prior art, to wash the observed portion in an organ, a water-jet-nozzle is formed at the tip of the video-scope and an exclusive water transmitting tube is provided through the video-scope. The water transmitting tube extends from the tip portion to an operating portion, and an inlet for the water transmitting tube is formed on the operating portion. When the water is injected into the inlet, the water jets from the water-jet-nozzle. Further, other liquid can be injected into the inlet in place of the water as required.

Various instruments for supplying water to the water transmitting tube are connectable to the inlet. For example, a physiological saline can be supplied with an injector or a water supply apparatus. In the case of the water supply apparatus, a switch for supplying the water is provided on a front panel, or is connected to the water supply apparatus as a foot switch. When supplying the water, the switch is operated.

During the operation or inspection, the operator (doctor) manipulates the tip of the video-scope by handling the operating portion, and operates a plurality of switch buttons provided on the operating portion. Accordingly, when spouting the water, the operator must discontinue the operation of the endoscope to operate the switch for supplying the water. Further, accurately adjusting the amount of the water while handling the operating portion is difficult.

SUMMARY OF THE INVENTION

Therefore, an object of the present invention is to provide an electronic endoscope system that is capable of properly spouting liquid from the tip of a video-scope without obstructing the operation of the video-scope.

An electronic endoscope system according to the present invention has a video-scope, a video-processor, and a liquid supply apparatus. The video-scope has an image sensor, and a liquid transmitting tube for spouting liquid from the tip of the video-scope. The liquid transmitting tube is different from water and air transmitting tubes, which are provided through the video-scope to wash an objective lens. The liquid transmitting tube extends from the tip portion to the operating portion. Liquid, such as water, is injected in an inlet formed in the operating portion, so that liquid jets from a nozzle formed at the tip portion.

The video-processor processes image signals read from the image sensor to display the subject image on a monitor, which is connected to the video-processor. The video-scope is detachably and electrically connected to the video-processor. The liquid supply apparatus is electrically connectable to the video-processor, and has a container for storing liquid. The container is spatially connectable to the liquid transmitting tube. The liquid supply apparatus includes a liquid supplier that supplies the liquid in the container to the liquid transmitting tube. For example, the liquid supply apparatus has a rotary pump, a motor, and a tube. The liquid in the container flows through the tube and is fed to the liquid transmitting tube by the rotation of the pump.

In the present invention, a liquid jet performance member for spouting the liquid is provided on the video-scope. Preferably, the liquid jet performance member is provided on an operating portion of the video-scope. For example, the liquid jet performance member is a switch button, a dial switch, a slide switch, or a switch lever. The operator operates the liquid jet performance member when spouting the liquid. Further, the electronic endoscope system has a liquid jet performance detector, and a liquid jet performance transmitter. The liquid jet performance detector detects the operational status of the liquid jet performance member. When the operation of the liquid jet performance member is detected, the liquid jet performance transmitter feeds a control signal for informing the operational status of the liquid jet performance member to the liquid supply apparatus. Then, the liquid supplier supplies the liquid in the container to the liquid transmitting tube in accordance with the control signal.

As the operator only has to operate the member provided at the video-scope when spouting the liquid, the operator can wash the observed portion without discontinuing the operation or inspection. Further, as a finger or a thumb is used when operating the member, the operator can properly control the supply of the liquid.

A liquid supply system for an endoscope according to the present invention has a video-scope, a liquid supply apparatus, and a liquid jet performance member. The video-scope has an image sensor and a liquid transmitting tube for spouting liquid from a tip of the video-scope. The liquid transmitting tube extends from the tip to an operating portion of the video-scope. The liquid supply apparatus is electrically connected to the video-scope, and has a container for storing liquid and a liquid supplier that supplies the liquid in the container to the liquid transmitting tube. The liquid jet performance member for spouting the liquid is provided on the video-scope. The liquid supplier supplies the liquid when the liquid jet performance member is operated.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENT

Hereinafter, the preferred embodiment of the present invention is described with reference to the attached drawings.

Figure 1:
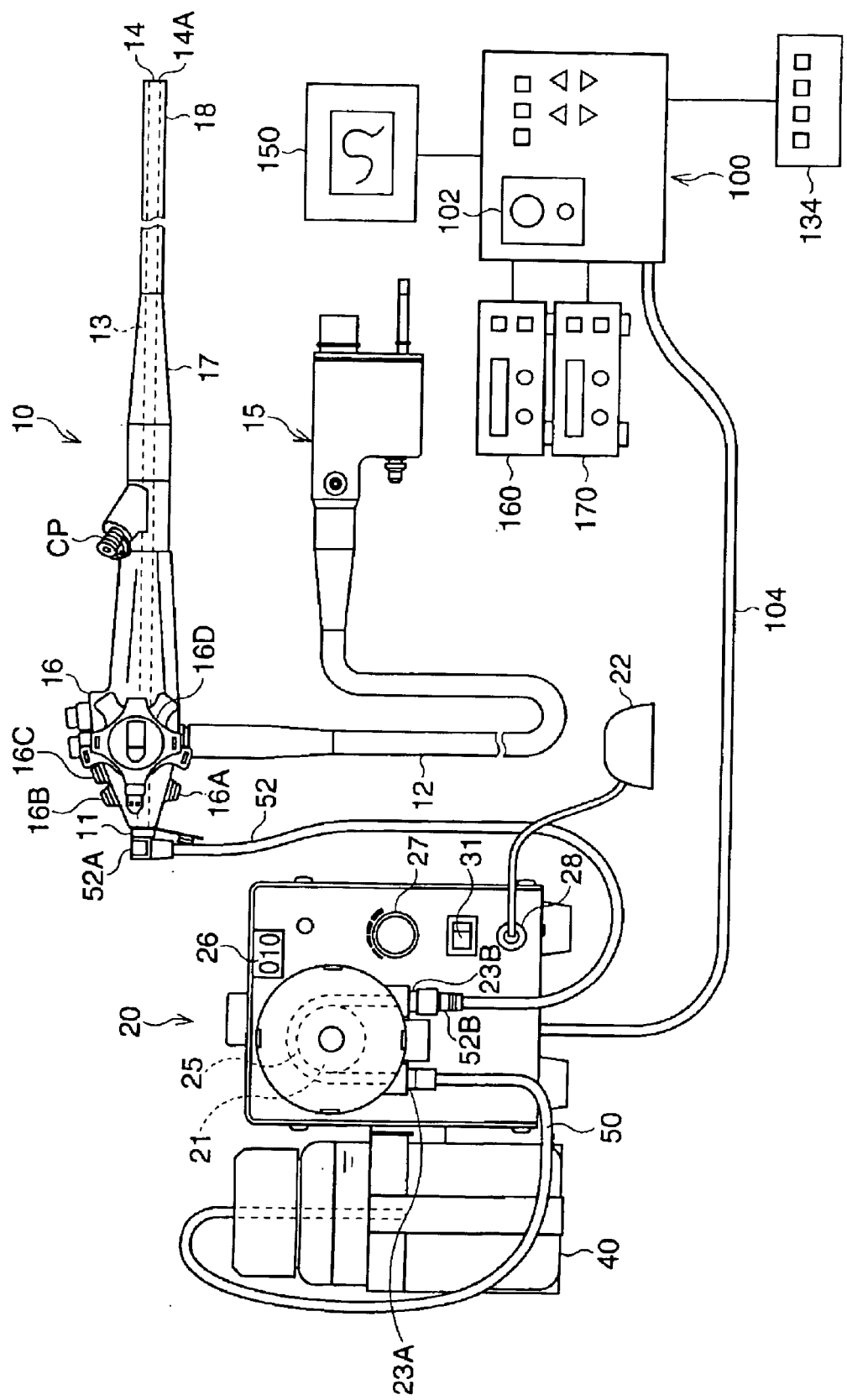
FIG. 1 is a plan view of an electronic endoscope system according to an embodiment of the present invention.

FIG. 1 is a plan view of an electronic endoscope system according to a present embodiment.

In the electronic endoscope system, a video-scope 10 and a video-processor 100 are provided. A monitor 150 for displaying an observed subject image, a video recorder 160 for recording the subject image, a printer 170 for printing the subject image, and a keyboard 134 for inputting character information are respectively connected to the video-processor 100.

A video-scope 10 has a bending portion 18 including a rigid tip portion 14, a flexible inserting portion 17, an operating portion 16 with a operating lever 16D for manipulating the bending portion 18, a connecting tube 12 for electrically and optically connecting the video-scope 10 with the video-processor 100, and a connector 15. The video-scope 10 is detachably connected to the video-processor 100 via the connecting tube 12 and the connector 15, the connector 15 being attached to a connecting portion 102 formed on the video-processor 100. A water supply apparatus 20 is spatially connectable to the video-scope 10 via a scope-connecting tube 52, which is connected to a water inlet 11 of the video-scope 10. Further, the water supply apparatus 20 is electrically connectable to the video-processor 100 via a signal cable 104. When the operation or inspection is started, the operator handles the operating portion 16 of the video-scope 10, and the inserting portion 17 is inserted into a body.

In the video-scope 10, a water transmitting tube 13 is provided between the water inlet 11 and the tip portion 14. When water is injected into the water inlet 11, the water flows through the water transmitting tube 13, and jets from a water jet nozzle 14A formed in the tip portion 14, which is the distal portion of the water transmitting tube 13. The water transmitting tube 13 is different from the water and air supplying tubes (not shown), which are formed between the connector 15 and the tip portion 14. The water and air supplying tubes are used to remove a dust (obstructions) on an objective lens (not shown) provided at the tip portion 14, or wash the objective lens. The water transmitting tube 13 is an exclusive tube for spouting the liquid from the tip portion 14 toward the observed portion in the organ. A forceps tube (not shown) is provided between a forceps inlet CP and the tip portion 14. The forceps tube is used to treat a diseased portion.

On the operating portion 16, in addition to the operating lever 16D, a VTR and water supply switch button 16A (hereinafter, designated as "a first switch button"), a copy and water supplying up switch button 16B (hereinafter, designated as "a second switch button"), a freeze and water supplying down switch button 16C (hereinafter, designated as "a third switch button") are provided. The first switch button 16A is a switch button for recording the subject image in the video recorder 160 as a moving image, and for supplying the water. The second switch button 16B is a switch button for printing the subject image at the printer 170, and, as described later, for raising the flow-velocity of the water jetting from the water jet nozzle 14A. The third switch button 16C is a switch button for recording and displaying the subject image as a still image, and for lowering the flow-velocity of the water. The first, second, and third switch buttons 16A, 16B, and 16C are respectively operated by a thumb, an index finger, and a middle finger of the left hand of the operator.

The scope connecting tube 52 is a flexible tube, and first and second connectors 52A and 52B are provided at the opposite ends of the scope connecting tube 52. The first connector 52A is connected to the water inlet 11 of the video-scope 10, whereas the second connector 52B is connected to an outlet 23B of the water supply apparatus 20. The water supply apparatus 20 has a tank 40, which stores water for washing the observed portion in the organ. A tank tube 50 is inserted into the tank 40, and is connected to an inlet 23A on the water supply apparatus 20. The water in the tank 40 is fed to the inside of the water supply apparatus 20 via the tank tube 50. Note that, in this embodiment, water is stored in the tank 40, however, other liquids may be stored in the tank 40 in place of the water.

A disk-shaped rotating pump 21 is provided in the water supply apparatus 20. A motor (herein, not shown) drives the pump 21 to supply the water in the tank 40 to the video-scope 10, namely, the water transmitting tube 13. Further, a coupling tube 25 for connecting the water inlet 23A and the water outlet 23B is provided in the water supply apparatus 20, so that the tank 40 is spatially connected to the water transmitting tube 13 via the tank tube 50, the coupling tube 25, and the scope connecting tube 52. The construction of the pump 21 is the same as a rotary type pump, which is used for supplying liquid medicine. Namely, the coupling tube 25 is tightly arranged along the circumference of the rotary pump 21, and pressing members (not shown) are arranged along the circumference of the pump 21 at regular intervals, so that the coupling tube 52 is pressed along the radial direction by the pressing members 52. Accordingly, when the pump 21 rotates, the water in the tank 40 is sucked up by the force, which operates between the pressing members and the coupling tube 25. The sucked water flows through the tank tube 50, the coupling tube 25, and the scope connecting tube 52 toward the water transmitting tube 13.

On a front panel of the water supply apparatus 20, a flow-velocity setting switch 27, a LCD (Liquid Crystal Display) 26, and a main electric power switch 31 are provided. Further, a foot switch inlet 28 for connecting a foot switch 22 is provided. The flow-velocity setting switch 27 is a dial switch for setting the flow-velocity of the water spouted in the organ, namely, the amount of the water fed to the inside of the organ per minute. In this embodiment, five values of the flow-velocity can be set by the operator. While the flow-velocity is set by the operator, the flow-velocity is displayed on the LCD 26.

Figure 2:
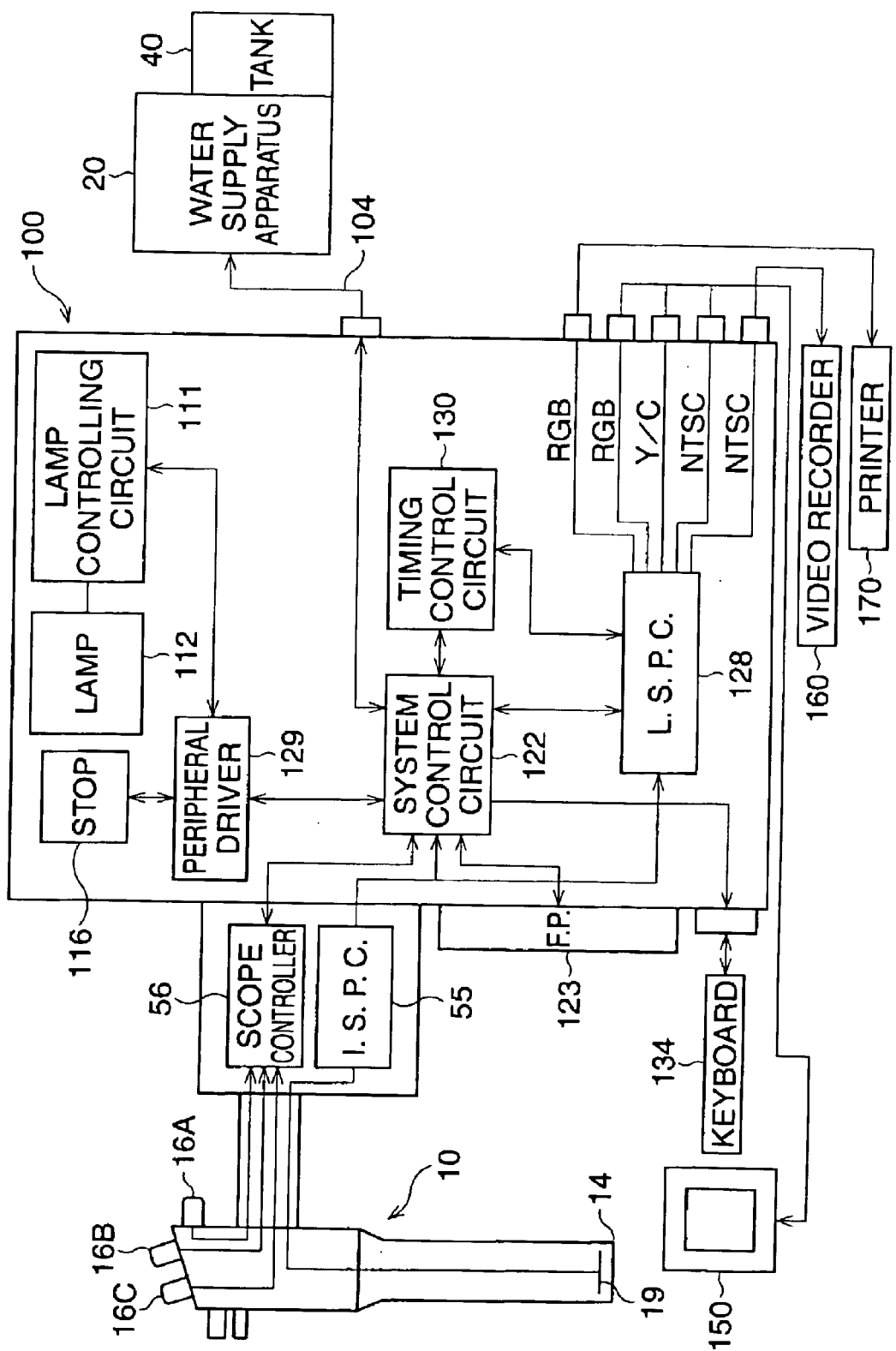
FIG. 2 is a block diagram of the electronic endoscope system of FIG. 1.

FIG. 2 is a block diagram of the electronic endoscope system.

A lamp 112 provided in the video-processor 100 radiates light, which enters into an incidence surface of a fiber-optic bundle (not shown) via a stop 116. The fiber-optic bundle transmits the light to the tip portion 14 so that the light is radiated from the tip portion 14, and the subject (observed portion) is illuminated by the radiated light.

Light reflected on the subject passes through an objective lens (not shown) provided in the tip portion 14, and reaches an image sensor (for example, CCD (Charge-Coupled Device)) 19. Consequently, the subject image is formed on the image sensor 19. In this embodiment, for the color imaging process, an on-chip color filter method using a single color filter is applied. On a photo-sensitive area of the image sensor 19, a color filter (not shown), checkered by four color elements of Yellow (Y), Magenta (M), Cyan (C), and Green (G), is arranged such that the four color elements are opposite the pixels arranged in the photo-sensitive area. In the image sensor 19, color image signals, corresponding to light passing through the color filter, are generated by the photoelectric transformation effect. The generated color image signals are read from the image sensor 19 at regular time intervals in accordance with the so called "color difference line sequential system". In this embodiment, the NTSC standard is applied as the color TV standard, accordingly, one field (frame) worth of image signals is read from the image sensor 19 at 1/60 (1/30) of a second time intervals, and is then fed to an initial signal processing circuit 55.

In the initial signal processing circuit 55, various processes are performed for the image signals, so that video signals including luminance signals and color difference signals are generated. The generated video signals are fed from the initial signal processing circuit 55 to a latter signal processing circuit 128 in the video-processor 100, and luminance signals are further fed to a system control circuit 122. A frame memory (not shown) for storing the one frame worth of image signals is provided in the latter signal processing circuit 128. The video signals are temporarily stored in the frame memory and a given process is then performed for the video signals. The processed video signals are output to the monitor 150 as NTSC composite signals, S-video signals, and R, G, B component signals. Thus, the subject image is displayed on the monitor 150.

The system control circuit 122 including a CPU (Central Processing Unit) controls the video-processor 100 and feeds control signals to a lamp controlling circuit 111, the latter signal processing circuit 128, and so on. In a timing control circuit 130, clock pulses are output to each circuit in the video-processor 100, and synchronizing signals to be interleaved in the video signals are fed to the latter signal processing circuit 128. The stop 116, which is provided between the incident surface of the fiber-optic bundle and the lamp 112, is opened and closed by a motor (not shown). The system control circuit 122 outputs driving signals to the motor via a peripheral driver 129 in accordance with the fed luminance signals, thus the stop 116 opens or closes such that the amount of light illuminating the subject becomes constant.

A scope controller 56, provided in the video-scope 10, controls the video-scope 10, namely, outputs control signals to the initial signal processing circuit 55 and reads data from an EEPROM (Electronic Erasable Programmable ROM), which is not shown in FIG. 2. When the video-scope 10 is connected to the video-processor 100, data is communicated between the scope controller 56 and the system control circuit 122. Namely, data associated with the video-scope 10 is fed to the system control circuit 122 and data associated with the video-processor 100 is fed to the scope-controller 56.

On a front panel 123 of the video-processor 100, a plurality of switch buttons, such as a setting switch button for setting a reference luminance level, are provided. When the operator operates a given switch button, an operating signal is fed to the system control circuit 122.

The water supply apparatus 20 is electrically connected to the system control circuit 122 in the video-processor 100 via the signal cable 104, and the keyboard 134 is also connected to the system control circuit 122. Further, the first, second, and third switch buttons 16A, 16B, and 16C on the video-processor 10 are electrically connected to the system control circuit 122 via the scope controller 56. When the water supply apparatus 20 is not connected to the video-processor 100, the first switch button 16A functions as a switch button for recording the subject image in the video recorder 160, the second switch button 16B functions as a switch button for printing the subject image on the printer 170, and the third switch button 16C functions as a switch button for displaying the subject image on the monitor 150 and recording the still image.

When the first switch button 16A is pressed, an ON signal corresponding to the first switch button 16A is input to the system control circuit 122. In the system control circuit 122, a control signal is output to the latter signal processing circuit 128 such that the NTSC composite signals are fed to the video recorder 160. Thus, the subject image is recorded as a moving image in the video recorder 160. On the other hand, when the thumb of the operator is detached from the first switch button 16A, an OFF signal is input to the system control circuit 122.

When the second switch button 16B is pressed, an ON signal corresponding to the second switch button 16B is input to the system control circuit 122. In the system control circuit 122, a control signal is output to the latter signal processing circuit 128 such that the R, G, B component signals are fed to the printer 170. Thus, the subject image is printed at the printer 170.

When the third switch button 16C is pressed, an ON signal corresponding to the third switch button 16C is input to the system control circuit 122. In the system control circuit 122, a control signal is output to the latter signal processing circuit 128 such that a specific one frame worth of video signals is stored in the frame memory, and is then continuously fed to the monitor 150. Thus, the still image is displayed on the monitor 150. Further, the one frame memory stored in the frame memory is stored in an image memory (not shown) in the video-processor 100.

On the other hand, when the water supply apparatus 20 is connected to the video-processor 100, the first switch button 16A functions as a switch button for supplying the water, the second switch button 16B functions as a switch button for raising the flow velocity of the water, and the third switch button 16C functions as a switch button for lowering the flow velocity. When the first switch button 16A, the second switch button 16B, or the third switch button 16C is pressed, a corresponding control signal is fed from the system control circuit 122 to the water supply apparatus 20.

Figure 3:
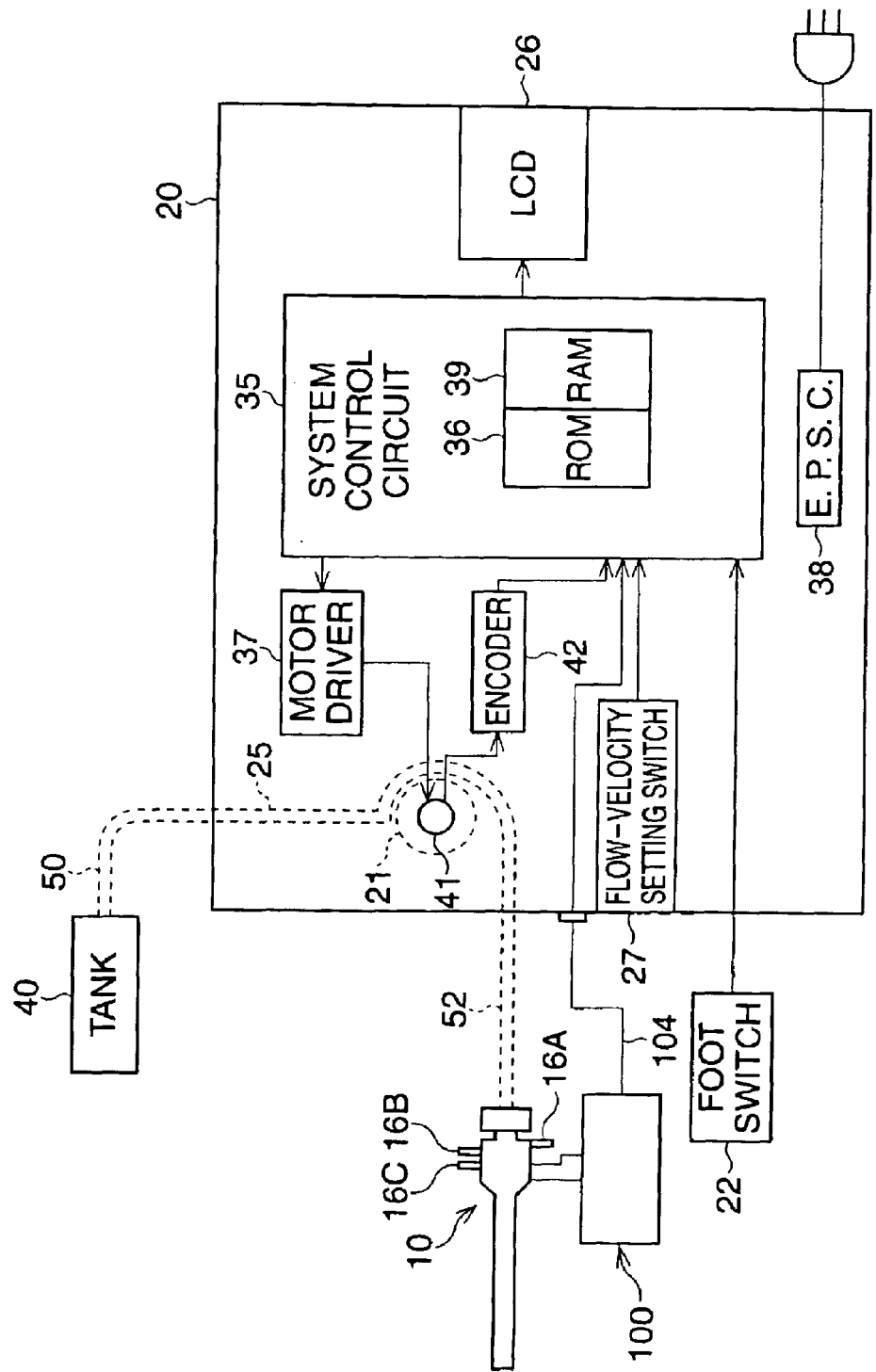
FIG. 3 is a block diagram of a water supply apparatus of FIG. 1.

FIG. 3 is a block diagram of the water supply apparatus 20.

A system control circuit 35 including a CPU (Central Processing Unit) controls the water supply apparatus 20. The foot switch 22, the flow-velocity setting switch 27, and the LCD 26 are respectively connected to the system control circuit 35. When the foot-switch 22, or flow-velocity setting switch 27 is operated, a corresponding signal is fed to the system control circuit 35. In the case of the flow-velocity setting switch 27, the flow-velocity set by the operator is temporarily stored in a RAM 39. The LCD 26 has an LCD panel, an LCD driver, and a backlight (all not shown). The system control circuit 35 outputs a control signal to the LCD driver in accordance with the data of the flow-velocity stored in the RAM 39. The LCD driver controls the LCD panel and the backlight is turned ON, so that the flow-velocity is displayed on the LCD 26. Electric power is supplied to each circuit in the water supply apparatus 20 by an electric power supply circuit 38.

When the foot switch 22 is operated, the system control circuit 35 outputs a control signal so that the motor 41 rotates in accordance with the set flow-velocity. While the foot switch is continuously pressed, the water in the tank 40 flows toward the water transmitting tube 13. When the operator separates his foot from the foot switch 22, the system control circuit 35 outputs a control signal to stop the pump 21. As described above, when the water supply apparatus 20 is connected to the video-processor 100, the first switch button 16A on the video-scope 10 is operated for supplying the water to the water transmitting tube 13. Similarly to the foot switch 22, the water in the tank 40 is supplied while the first switch button 16A is pressed.

The motor 41 is a direct current motor, which is driven in accordance with PWM (Pulse Width Modulation) control. The pump 21 rotates in accordance with the rotation of the motor 41. A motor driver 37 feeds a driving signal to the motor 41 in accordance with a control signal fed from the system control circuit 35. The rotating speed of the motor 41 depends upon the flow velocity set by the flow-velocity setting switch 27.

In this embodiment, as shown in a following table T, a relationship between the flow-velocity of the water, which is set by the flow-velocity setting switch 27 (or the second and third switch buttons 16B and 16C), and the rotating speed of the motor 41, is stored in a ROM 36 as data in advance. The table T is also stored in a ROM (not shown) included in the system control circuit 122 of the video-processor 100, to display the flow-velocity on the monitor 150.

TABLE T

| ROTATING SPEED | MOTOR POWER (%) | FLOW-VELOCITY Li (ml/sec) |
|---|---|---|
| V1 | 100 | 10.0 |
| V2 | 85 | 8.5 |
| V3 | 70 | 7.0 |
| V4 | 55 | 5.5 |
| V5 | 40 | 4.0 |

In the table T, the corresponding relationship between five flow-velocities Li and the corresponding five rotating speeds of the motor 41 and the corresponding five power rates of the motor 41, is shown. The rotating speed of the motor 41 is defined on the basis of the table T. For example, when the flow-velocity Li is set to "10.0 ml", the motor 41 is driven such that the power rate of the motor 41 becomes 100%. Namely, the motor 41 rotates at the maximum speed "V1".

The flow-velocity increases or decreases step by step by rotating the dial type flow-velocity setting switch 27 step by step. On the other hand, when the video-processor 100 is connected to the water supply apparatus 20, the flow-velocity increases or decreases every time the operator presses the second switch button 16B or third switch button 16C.

When the motor 41 is driven, the rotating speed of the motor 41 is detected by an encoder 42. Then, a voltage signal corresponding to the rotating speed is fed to the system control circuit 35. To perform the feedback control for the motor 41, a difference between the set rotating speed and the detected rotating speed is calculated in the system control circuit 35, and a control signal corresponding to the difference is fed to the motor driver 37.

Figure 4:
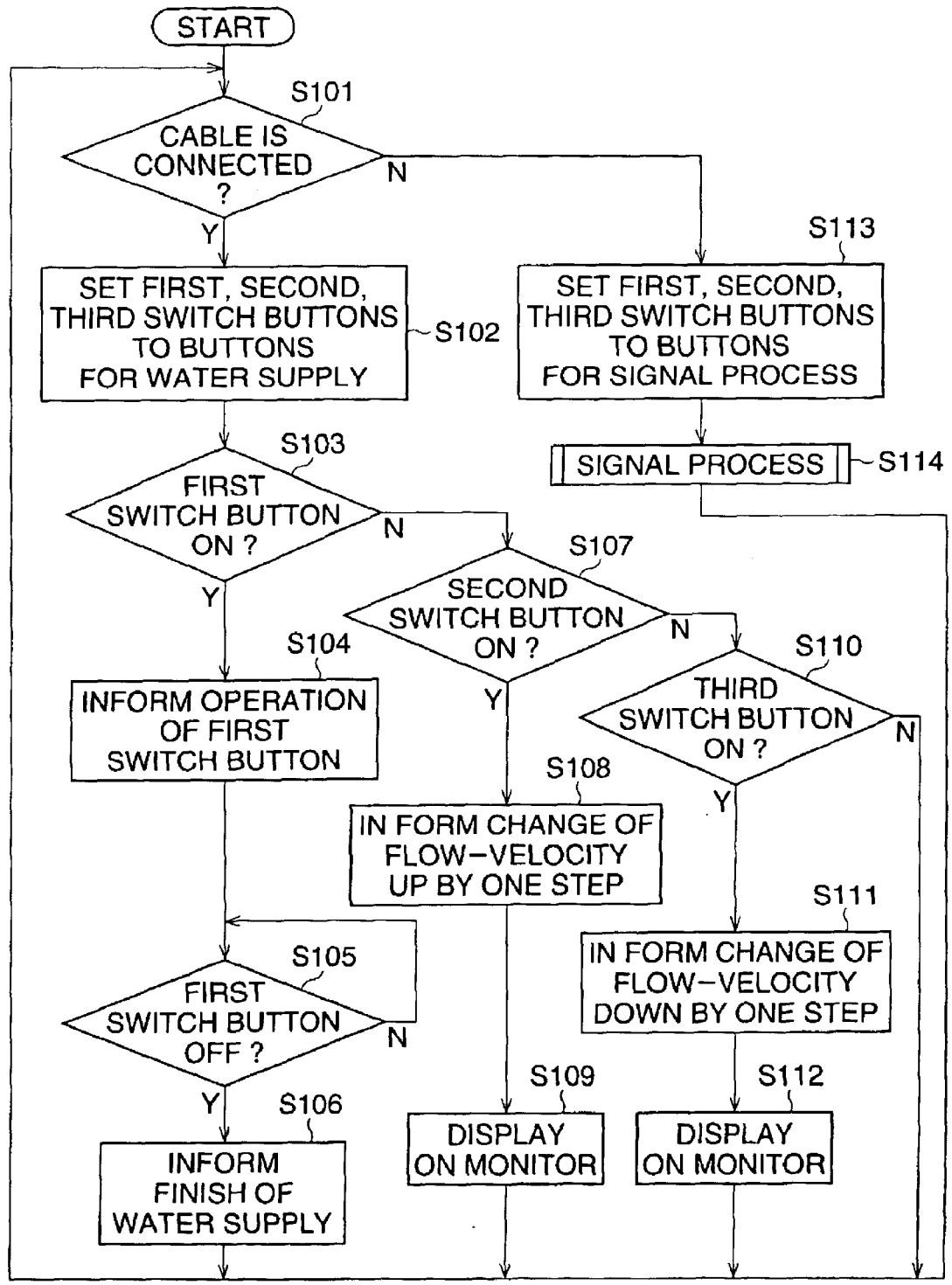
FIG. 4 is a flowchart showing a water supply process, performed at a system control circuit in a video-processor of FIG. 2.

FIG. 4 is a flowchart showing a water supply process, performed in the system control circuit 122 in the video-processor 100. When a main electric power switch (not shown) is turned ON, the water supply process is performed.

In Step S101, it is determined whether the signal cable 104 is connected to the video-processor 100. When it is determined that the signal cable 104 is connected to the video-processor 100, the process goes to Step S102. In Step S102, the first switch button 16A is set to the switch button for performing the water supply, the second switch button 16B is set to the switch button for raising the flow-velocity, and the third switch button 16C is set to the switch button for lowering the flow-velocity. Further, the value of the flow-velocity, determined in the water supply apparatus 20, is fed to the system control circuit 122 as data. After Step S102 is performed, the process goes to Step S103, wherein it is determined whether the first switch button 16 A is pressed to perform the water supply.

When it is determined that the ON signal of the first switch button 16A is detected, namely, the first switch button 16A is pressed in Step S103, the process goes to Step S104. In Step S104, a signal for informing that the first switch button 16A is pressed (hereinafter, designated as a "first ON signal"), is fed from the system control circuit 122 to the system control circuit 35 in the water supply apparatus 20. After Step S104 is performed, the process goes to Step S105, wherein it is determined whether the operator detaches thumb from the first switch button 16A to suspend, or finish the water supply.

When it is determined that the OFF signal of the first switch button 16A is detected in Step S105, namely, the operator has ceased pressing the first switch button 16A, the process goes to Step S106, wherein a signal for informing that the first switch button 16A is not pressed (hereinafter, designated as a "first OFF signal"), is fed from the system control circuit 122 to the system control circuit 35 in the water supply apparatus 20. On the other hand, when it is determined that the OFF signal is not detected, because the first switch button 16A is continuously being pressed, Step S105 is repeatedly performed until the OFF signal is detected. After Step S106 is performed, the process returns to Step S101.

On the other hand, when it is determined that the first switch button 16A is not pressed in Step S103, the process goes to Step S107, wherein it is determined whether the second switch button 16B is pressed for raising the flow-velocity.

When it is determined that the second switch button 16B is pressed in Step S107, the process goes to Step S108, wherein a signal for informing that the second switch button 16B is pressed (hereinafter, designated as a "second signal"), is fed to the system control circuit 35 in the water supply apparatus 20. After Step S108 is performed, the process goes to Step S109.

In Step S109, the flow-velocity changed by operating the second switch button 16B is displayed on the monitor 150. Namely, in the system control circuit 122 of the video-processor 100, a character signal corresponding to the flow-velocity changed by the second switch button 16B is generated in accordance with the table T and the flow-velocity data fed from the water supply apparatus 20. The generated character signal is fed to the latter signal processing circuit 128 at a given timing, and the character signal is superimposed in the video signals. Consequently, the changed flow-velocity is displayed on the monitor 150 in addition to the subject image. After Step S109 is performed, the process goes to Step S101.

On the other hand, when it is determined that the second switch button 16B is not pressed in Step S107, the process goes to Step S110, wherein it is determined whether the third switch button 16C is pressed. When it is determined that the third switch button 16C is not pressed, the process returns to Step S101. On the other hand, when it is determined that the third switch button 16C is pressed, the process goes to Step S111.

In Step S111, a signal for informing that the third switch button 16C is pressed (hereinafter, designated as a "third signal"), is fed to the system control circuit 35 in the water supply apparatus 20. Then, in Step S112, similarly to Step S109, the flow-velocity, changed by the third switch button 16C, is displayed on the monitor 150. After Step S112 is performed, the process returns to Step S101.

On the other hand, when it is determined that the signal cable 104 is not connected to the video-processor 100 in Step S101, the process goes to Step S113. In Step S113, the first switch button 16A is set as the switch button for recording the subject image as a moving image, the second switch button 16B is set as the switch button for printing the subject image, and the third switch button 16C is set as the switch button for displaying and recording the still subject image. In Step S114, a signal process corresponding to the pressed switch button is performed. After Step S114 is performed, the process returns to Step S101.

Figure 5:
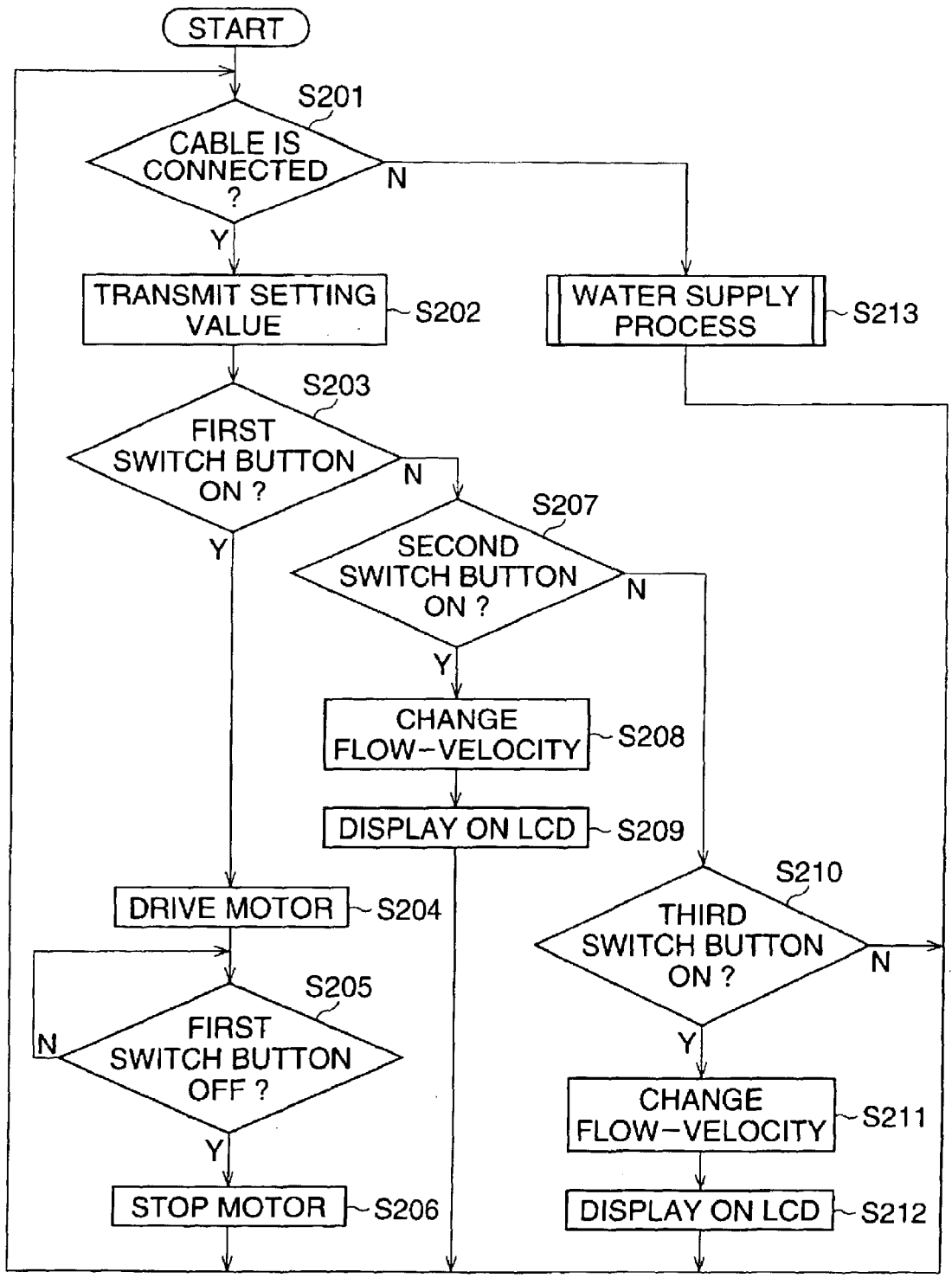
FIG. 5 is a view showing a flowchart of the water supply process, performed at a system control circuit in water supply apparatus of FIG. 3.

FIG. 5 is a view showing a flowchart of the water supply process, performed at the system control circuit 35 in water supply apparatus 20. When the electric power switch of the water supply apparatus is turned ON, the water supply process is started.

In Step 201, it is determined whether the water supply apparatus 20 is connected to the video-processor 100 via the signal cable 104. When it is determined that the water supply apparatus 20 is not connected to the video-processor 100, the process goes to Step S213, wherein the water supply process, which has no relation to the operation of the first, second, and third switch button 16A, 16B, and 16C, is performed. On the other hand, when the water supply apparatus 20 is connected to the video-processor 100, the process goes to Step S202.

In Step S202, data associated with the flow-velocity is fed to the system control circuit 122 in the video-processor 100. Herein, the initial value of the flow-velocity is set to "7.0 ml/sec". Then, the process goes to Step S203. In Step S203, it is determined whether the first ON signal is fed from the system control circuit 122 of the video-processor 100 to the system control circuit 35. The first ON signal is a signal for informing that the first switch button 16A is pressed, as described above (See Step S104).

When it is determined that the first ON signal is fed from the system control circuit 122 in Step S203, the process goes to Step S204, wherein a control signal for rotating the motor 41 is fed from the system control circuit 35 to the motor driver 37. Thus, the water in the tank 40 flows through the water transmitting tube 13 and jets from the tip portion 14. After Step S204 is performed, the process goes to Step S205.

In Step S205, it is determined whether the first OFF signal (See Step S106) is fed from the system control circuit 122 in the video-processor 100. When it is determined that the first OFF signal is not fed from the system control circuit 122, Step S205 is repeatedly performed. On the other hand, when it is determined that the first OFF signal is fed from the system control circuit 122, the process goes to Step S206, wherein a control signal for stopping the motor 41 is fed from the system control circuit 35 to the motor driver 41. Consequently, the pump 21 stops and the water supply is terminated. After Step S206 is performed, the process goes to Step S201.

On the other hand, when it is determined that the first ON signal is not fed from the system control circuit 122 in Step S203, the process goes to Step S207, wherein it is determined whether the second signal (See Step S108) is fed from the system control circuit 122 of the video-processor 100. When it is determined that the second signal is fed from the system control circuit 122 in Step S207, the process goes to Step S208, wherein the flow-velocity is raised by one step in accordance with the table T. Then, in Step S209, the changed flow-velocity is displayed on the LCD 26 of the water supply apparatus 20. After Step S209 is performed, the process goes to Step S201.

On the other hand, when it is determined that the second signal is not fed from the system control circuit 122 at Step S207, the process goes to Step S210. In Step S210, it is determined whether the third signal (See Step S111) is fed from the system control circuit 122 of the video-processor 100. When it is determined that the third signal is fed from the system control circuit 122, the process goes to Step S211, wherein the flow-velocity is lowered by one step. Then, in Step S212, the changed flow-velocity is displayed on the LCD 26. On the other hand, when it is determined that the third signal is not fed from the system control circuit 122, the process returns to Step S201.

In this way, in this embodiment, the first switch button 16A functions as the button for supplying and spouting the water. Further, the second and third switch buttons 16B and 16C function as the buttons for changing the flow-velocity. When the first switch button 16A is pressed, the signal for performing the water supply is fed to the water supply apparatus 20. Thus, the motor 41 operates to rotate the pump 21. On the other hand, when the second switch button 16B or third switch button 16C is pressed, a signal for changing the flow-velocity is fed to the water supply apparatus 20. Thus, the flow-velocity is changed. At this time, the changed flow-velocity is displayed on the monitor 150, in addition to the LCD 26 of the water supply apparatus 20.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2001-265305 (filed on Sep. 3, 2001) which is expressly incorporated herein, by reference, in its entirety.

What is claimed is:

1. An electronic endoscope system comprising:
    a video-scope that has an image sensor and a liquid transmitting tube that spouts liquid from a tip of said video-scope;
    a video-processor that processes image signals read from said image sensor, said video-scope being detachably and electrically connected to said video-processor;
    a liquid supply apparatus that is electrically connectable to said video-processor and that includes a container that stores liquid, said container being spatially connectable to said liquid transmitting tube;
    a liquid jet performance member that initiates spouting the liquid from the tip of said video-scope, said liquid jet performance member being provided on said video-scope;
    a liquid jet performance detector that detects the operational status of said liquid jet performance member; and
    a liquid jet performance transmitter that feeds a control signal regarding the operational status of said liquid jet performance member to said liquid supply apparatus when the operation of said liquid jet performance member is detected,
    wherein said liquid supply apparatus includes a liquid supplier that supplies the liquid in said container to said liquid transmitting tube in accordance with the control signal.

2. The electronic endoscope system of claim 1, further comprising:
   a flow-velocity setting member that changes a flow-velocity of the liquid, which is fed to said liquid transmitting tube, said flow-velocity setting member being provided on said video-scope;
   a flow-velocity change detector that detects whether said flow-velocity setting member is operated;
   a flow-velocity change transmitter that feeds a transmitting signal, for informing the operation of said flow-velocity setting member, to said liquid supply apparatus; and
   a flow-velocity adjuster that changes the flow-velocity in accordance with the transmitting signal.

3. The electronic endoscope system of claim 1, further comprising:
   a VTR performance member that records a subject image as a moving image;
   a copy performance member that prints the subject image;
   a freeze performance member that displays the subject image as a still image, said VTR performance member, said copy performance member, and said freeze performance member being provided on said video-scope;
   a connecting detector that detects whether said liquid supply apparatus is electrically connected to said video-processor; and
   a member setter that sets one of said VTR performance member, said copy performance member, and said freeze performance member as said liquid jet performance member, when said liquid supply apparatus is electrically connected to said video-processor.

4. The electronic endoscope system of claim 3, further comprising:
   a flow-velocity setting member that changes a flow-velocity of the liquid, which is fed to said liquid transmitting tube, said flow-velocity setting member being provided on said video-scope, said flow-velocity setting member having an up member for raising the flow-velocity and a down member for lowering the flow-velocity;
   a flow-velocity change detector that detects whether said flow-velocity setting member is operated;
   a flow-velocity change transmitter that feeds a transmitting signal, for informing the operation of said flow-velocity setting member, to said liquid supply apparatus; and
   a flow-velocity adjuster that changes the flow-velocity in accordance with the transmitting signal;
   wherein said member setter sets one of remaining two members among said VTR performance member, said copy performance member, and said freeze performance member, which are not being used as said liquid jet performance member, as said up member, and sets the other member of said two members as said down member, when said liquid supply apparatus is electrically connected to said video-processor.

5. The electronic endoscope system of claim 2, further comprising:
   a monitor that is connected to said video-processor and that displays the subject image; and
   a flow-velocity displayer that displays the flow-velocity, changed by said flow-velocity setting member, on said monitor.

6. The electronic endoscope system of claim 4, further comprising:
   a monitor that is connected to said video-processor and that displays the subject image; and
   a flow-velocity displayer that displays the flow-velocity, changed by said up member and said down member, on said monitor.

7. An electronic endoscope comprising:
   a video-scope that has an image sensor and a liquid transmitting tube that spouts liquid from a tip of said video-scope;
   a video-processor that processes image signals read from said image sensor, said video-scope being detachably and electrically connected to said video-processor;
   a liquid jet performance member that initiates spouting the liquid from the tip of said video-scope, said liquid jet performance member being provided on said video-scope;
   a liquid jet performance detector that detects the operational status of said liquid jet performance member; and
   a liquid jet performance transmitter that is capable of outputting a control signal regarding the operational status of said liquid jet performance member, when the operation of said liquid jet performance member is detected.

8. A liquid supply apparatus electrically connectable to the endoscope according to claim 7 wherein said liquid supply apparatus can receive said control signal and is capable of supplying liquid to the liquid transmitting tube, said liquid supply apparatus comprising:
   a container that stores the liquid; and
   a liquid supplier that supplies the liquid in said container to said liquid transmitting tube in accordance with said control signal.

9. A liquid supply system for endoscope comprising:
   a video-scope that has an image sensor and a liquid transmitting tube that spouts liquid from a tip of said video-scope, said liquid transmitting tube extends from the tip to an operating portion of said video-scope;
   a liquid supply apparatus that is electrically connected to said video-scope, and has a container that stores liquid and a liquid supplier that supplies the liquid in said container to said liquid transmitting tube; and
   a liquid jet performance member that initiates spouting the liquid and image processing,
   wherein said liquid jet performance member is provided on said video-scope, and said liquid supplier supplies the liquid or images are processed when said liquid jet performance member is operated.

* * * * *